J. J. WHITE.
Belt-Shifting Pulley.
No. 204,929. Patented June 18, 1878.
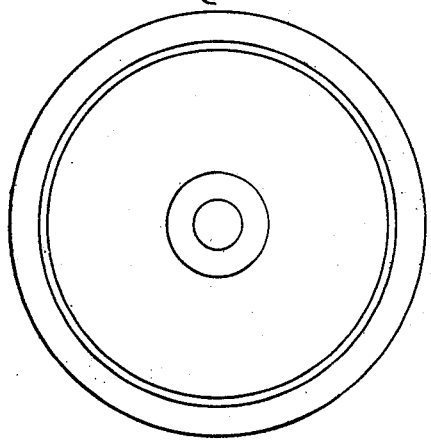
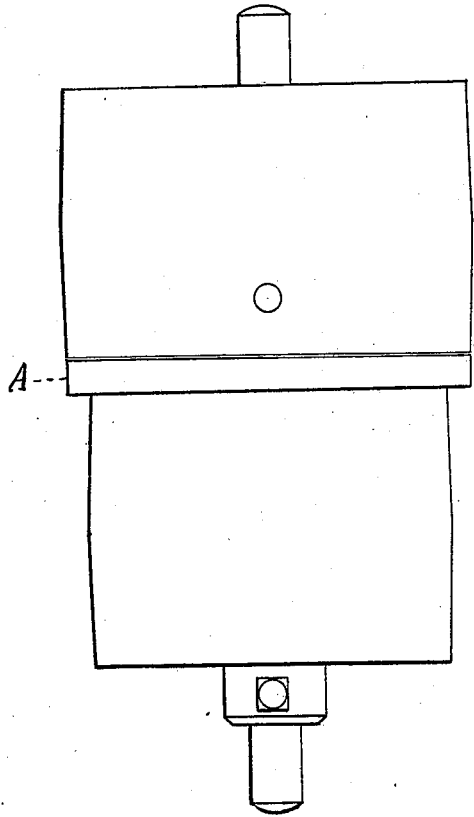
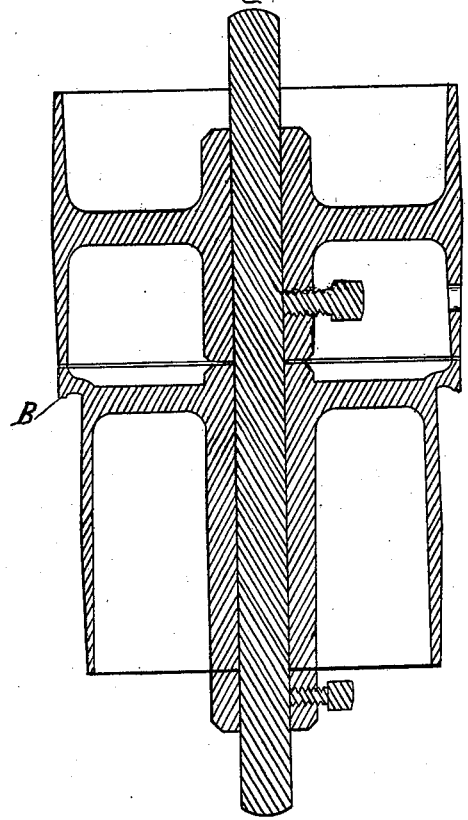
Witnesses:
E. F. Burns.
D. H. Aaronson.
Inventor:
J. J. White.

UNITED STATES PATENT OFFICE.

JOSEPH J. WHITE, OF SMITHVILLE, NEW JERSEY, ASSIGNOR TO H. B. SMITH MACHINE COMPANY, OF SAME PLACE.

IMPROVEMENT IN BELT-SHIFTING PULLEYS.

Specification forming part of Letters Patent No. 204,929, dated June 18, 1878; application filed April 6, 1878.

*To all whom it may concern:*

Be it known that I, JOSEPH J. WHITE, of Smithville, in the county of Burlington and State of New Jersey, have invented a new and useful Improvement in Belt-Shifting Pulleys, of which the following is a specification:

The invention relates to loose and tight pulleys of different diameters, and to means of shifting the belt from one to the other.

Heretofore, tight and loose pulleys have been made of different diameters for the purpose of removing the tension from the belt while running upon the loose pulley, thereby relieving the pulley of unnecessary friction and wear upon the shaft, and means have been devised for shifting belts from loose pulleys to tight pulleys of larger diameter; but in practice they have proved very defective.

Inclined planes applied to flanges and shippers for the purpose of guiding the belt from one pulley to the other have been constructed, but they accomplish the object in a very unsatisfactory manner, their injurious effect upon the belting outweighing all advantages derived from their use.

The object of my invention is to provide cheap and efficient means for shipping belts from loose pulleys to tight pulleys of larger diameter without injury to the belting.

The invention consists in the provision of a flange on the loose pulley adjacent to the tight pulley, which flange is so shaped that when the belt is pressed against its side the friction between the side of the flange and the edge of the belt will lift the belt in position to be easily shipped upon the tight pulley.

In the accompanying drawing, in which similar letters of reference indicate like parts, Figure 1 is a side elevation. Fig. 2 is an end elevation, and Fig. 3 is a sectional view.

The side of the flange A is so arranged that upon being pressed against it the belt will engage with it, and the friction thus produced will lift the belt from the face of the loose pulley.

The operation of the device is as follows: When the belt is pressed against the side of the flange, the latter being in rotation, the friction produced will lift the belt in position to be shipped upon the tight pulley expeditiously and without injury of any kind.

What I claim is—

On a loose pulley, and adjacent to a fixed pulley of greater diameter, a flange whose side is shaped to engage the belt, and by the friction produced lift the belt upon the tight pulley, substantially as and for the purpose described.

JOSEPH J. WHITE.

Witnesses:
E. F. BURNS,
D. H. AARONSON.